G. R. Patton,
Fence Post Support.
Nº 76,515. Patented Apr. 7, 1868.

Witnesses:
O. P. Dodge
J. N. Meaker.

Inventor:
G. R. Patton
by Dodge & Mann
his attys.

United States Patent Office.

GARRET R. PATTON, OF JUDA, WISCONSIN.

Letters Patent No. 76,515, dated April 7, 1868.

IMPROVEMENT IN FENCE-POSTS.

The Schedule referred to in these Letters Patent and making part of the same.

TO ALL WHOM IT MAY CONCERN:

Be it known that I, GARRET R. PATTON, of Juda, in the county of Green, and State of Wisconsin, have invented certain new and useful Improvements in Metallic Supports for Posts; and do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to metallic supports or bases for fence, gate, or other posts, and consists of a novel device for conveniently receiving and holding them firmly in position. In the drawings—

Figure 1:
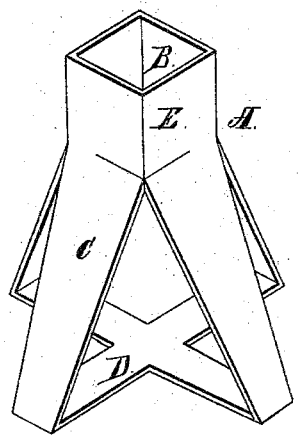
Figure 1 is a plan view.
Figure 2:
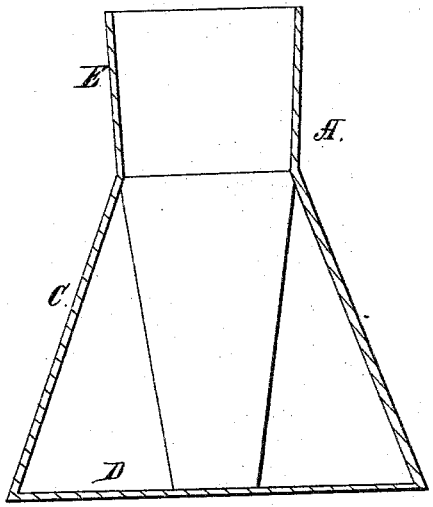
Figure 2 is a longitudinal vertical section of fig. 1.

I construct my device or post-support, A, of metal, and of any desired size. Its upper end, which is intended to be above the surface of the ground, I shape in the form of a socket, B, with its sides E a little flaring, so that the upper end of the socket B may be a little larger than the lower one. The socket B is for the tenon of the post. From the base of the socket B, I extend four legs, C, making them of any length desired, and spreading outward, as shown in figs. 1 and 2, and their lower ends I connect by cross-bars D, as plainly shown in fig. 1.

In the drawings, the socket B is represented as square, and as having four legs, C, connected by cross-bars D, but it is obvious that the socket B may be constructed with any number of sides, or may be made circular, and have more than four legs, if desired. The upper end of the socket is represented as plain, but it may have an ornamental rim, of any design to suit the fancy of the constructor or owner.

The whole I call a metal base or support for posts. Its advantages consist in its durability, the firmness with which it may be fixed in the ground, its suitableness for all movements of the soil caused by freezing and thawing, its stability, and its convenience for receiving and firmly holding the post when inserted in the socket.

Being made of metal, it must be lasting. As the socket is above ground, and made flaring, the post will be less liable to rot, and will settle more and more firmly into its seat. The soil, resting and crowded upon the sides of its legs C, and upon the top of the cross-bars D, must hold it firmly in place, and secure it against tipping, and when freezing or thawing, will only tend to hold it more securely in position.

In making it, I cast it out of iron, in a single piece, and ready for use, and am thus enabled to make a cheap, serviceable, convenient, and substantial metal support for posts of all descriptions to be placed in the ground, and ready for use.

Having thus described my invention, what I claim, is—

A metallic base or support for posts, consisting of the socket B, spreading legs C, and cross-bars D arranged and constructed substantially as herein described.

GARRET R. PATTON.

Witnesses:
S. WITMER,
J. H. WITMER.